United States Patent [19]
Dobson et al.

[11] 3,798,432
[45] Mar. 19, 1974

[54] MEASUREMENT OF PRESSURE RATIO

[75] Inventors: Patrick Francis Dobson, Brentwood; David Alfred Wyman, Goodmayes, both of England

[73] Assignee: Plessey Handel Und Investments A.G., Zug, Switzerland

[22] Filed: July 24, 1972

[21] Appl. No.: 274,694

[52] U.S. Cl.......... 235/151.34, 235/151.3, 235/196, 235/201 R, 328/150
[51] Int. Cl. .......................... G06g 7/16, G06g 7/50
[58] Field of Search............ 235/151.3, 151.34, 196, 235/197, 200 R, 201 R, 201 FS; 318/599; 328/150, 161; 324/140 D; 73/407 PR; 137/81.5

[56] References Cited
UNITED STATES PATENTS
3,553,593  1/1971  Gedance.......................... 328/150 X
3,568,702  3/1971  Dustin.......................... 235/201 R X
3,535,503  10/1970  Hellen.......................... 235/151.34 X
3,491,944  1/1970  Fudim............................ 235/200 R Primary Examiner—Felix D. Gruber
Assistant Examiner—Jerry Smith
Attorney, Agent, or Firm—Blum, Moscovitz, Friedman, & Kaplan

[57] ABSTRACT

Apparatus for evaluating width-modulated pulse waveforms, more particularly fluidic pulse waveforms which are obtained at the output of a substantially symmetrically constructed two-way switching device, wherein the evaluating means are arranged to form the algebraic sum of two outputs respectively obtained at the two outlets of the said switching device with the sign of one of these outputs reversed, and to determine the pulse width-to-cycle ratio, hereinafter called the duty ratio, of the output waveform at a level halfway between the minimum and maximum levels of the waveform thus obtained.

11 Claims, 9 Drawing Figures

MEASUREMENT OF PRESSURE RATIO

DISCLOSURE

This invention relates to apparatus for evaluating width-modulated pulse waveforms, more particularly fluidic pulse waveforms.

Co-pending Pat. application Ser. No. 148,774 by Guy E. Davies and others, now issued as Pat. No. 3,722,521, dated Mar. 27, 1973 describes a fluidic apparatus which produces by fluidic means an output signal in the form of a pulse-width modulated pressure-pulse waveform in which the ratio of the width of an individual pulse to the total length of the pulse cycle is a measure of the ratio of two pressures supplied to the apparatus. The interpretation of the pulse output of the apparatus described in the said co-pending application, and of a pulse-width modulated fluidic output in general, is however difficult because the pulses obtained are by no means truly rectangular and the fluidic switch-over which determines the beginning and the end of the width-modulated pulse occurs respectively at the upper and lower amplitude peak of the pressure so that there is no predetermined pressure level at which the spacing between the leading and trailing edge of a pulse can be expected to be equal to the pulse width as determined by the two respective switching points.

The present invention has for an object to provide improved means for evaluating width-modulated pulse waveforms, more particularly fluidic pulse waveforms which are obtained at the output of a substantially symmetrically constructed two-way switching device, and which greatly reduce this difficulty.

According to a broad aspect of the present invention the evaluating means are arranged to form the algebraic sum of two outputs respectively obtained at the two outlets of the said switching device with the sign of one of these outputs reversed, and to determine the pulse-width-to-cycle ratio, hereinafter called the duty ratio, of the output waveform at a level halfway between the minimum and maximum levels of the waveform thus obtained.

Since the switching device in question is symmetrically built, it follows that in the case of a fluidic switching device the pressure rise in each output branch following a switch-over to that branch is identical with the corresponding pressure rise in the other output branch following a switch-over to the latter, and the same applies to the pressure drop in each branch; following a switch-over to the other branch and the leading and trailing edges of each pulse of the composite signal obtained as a result of the said algebraic addition are therefore of identical shape except for the reversal of their gradients, so that, at a level halfway between the upper and lower amplitude-peak levels of the pulse waveform, the time delay at the leading edge of the pulse, from the moment of switch-over which initiates this leading edge to the point at which this leading edge reaches the described half-way level, is equal to the time delay, at the trailing edge of the pulse, from the moment of switch-over which initiates the trailing edge of the pulse to the point at which this trailing edge passes through the said half-way level. Accordingly at this halfway level the spacing in time between the leading and trailing edges of the pulse is substantially identical to the spacing in time between the switching operation initiating the formation of the pulse and occurring when the waveform pressure is at its bottom level, and the switching operation terminating the pulse and occurring when the waveform pressure is at its top level.

Preferably the pulse-width modulated fluidic pressure waveform is, for the purpose of its evaluation, converted into an electrical waveform, and for this purpose, according to a preferred form of the invention, means are provided which convert the pressure at each of the two outlets of the fluidic device individually into an electrical waveform, and means which algebraically add, with reversed sign, the electrical waveform obtained by conversion of the pressure waveform at one of the outlets to the electrical waveform obtained by conversion of the pressure waveform at the other outlet. This has the advantage that the influence of any non-linearity of the transducers employed for the conversion of pressures into electrical values will alter the shapes of the rising and falling pulse fronts in an identical manner so that such non-linearity will not affect the accuracy of the determination of the duty ratio at the halfway level. Another advantage of this arrangement is that, if the electrical outputs of the two transducers are transmitted, in a common cable, to a remote point at which these two electrical outputs are added with the sign of one of the outputs reversed, the respective influence of any external fields and the like upon the two output values transmitted in the cable will neutralise each other when the values are combined in the described manner at the remote station, while the manner of combination, in conjunction with the use of the halfway level for the determination of the duty ratio, neutralises the influence of voltage drifts such as that occurring when piezoelectric transducers produce an output waveform having a duty ratio substantially different from 1 : 2. The invention also provides novel circuits for evaluating the resulting, pulsewidth-modulated periodic electrical waveform, and these circuits constitute further aspects of the invention.

In one of these circuits the waveform is applied in parallel to two clamp circuits each arranged to produce a replica of the waveform clamped respectively to the upper and to the lower peak level of the waveform amplitude, and the two outputs of these clamp circuits are applied to a load circuit so centre-tapped so as to produce a replica waveform which is so clamped in its DC level that its voltage passes through zero halfway between the upper and lower peaks of the amplitude of the waveform, the output from said centre tapping and a zero voltage-level reference being applied to a final evaluator circuit responsive to the times and directions of the zero passages of the waveform obtained at said centre tapping. Preferably said final evaluator comprises a high-gain differential amplifier arranged to produce an amplifier output which at each zero passage of said clamped replica waveform changes abruptly from saturation current in one direction to saturation current in the opposite direction.

In an alternative circuit the waveform is applied in parallel to two peak-voltage detectors arranged to produce output voltages respectively corresponding to the upper and to the lower peak level of the said waveform, these output voltages being respectively applied to the two ends of a centre-tapped load circuit to produce at the centre tapping a reference voltage-level, this reference voltage level and the said waveform being applied to a final evaluator circuit responsive to the times and directions of the passages of the voltage of said waveform through said reference voltage level, and preferably said final evaluator circuit comprises a high-gain differential amplifier for comparison of said reference voltage level with the momentary voltage of the said waveform, so that the sign of the output of the differential amplifier changes each time the momentary voltage of the said waveform crosses a voltage level halfway between the upper and lower voltage peaks of the said waveform.

In either case the output of said high-gain differential amplifier is preferably applied to an electronic switch connected to a constant-voltage supply to produce a rectangular waveform changing, between zero voltage and the constant voltage of said supply each time the composite electrical waveform or its clamped replica crosses the level of the reference voltage, this rectangular waveform being applied to an averaging amplifier.

In order that the invention may be more readily understood, an embodiment of the invention and some modifications thereof, as applied to the fluid-pressure pulse output of a device according to said co-pending application, will now be described with reference to the accompanying drawings, in which.

Figure 1:
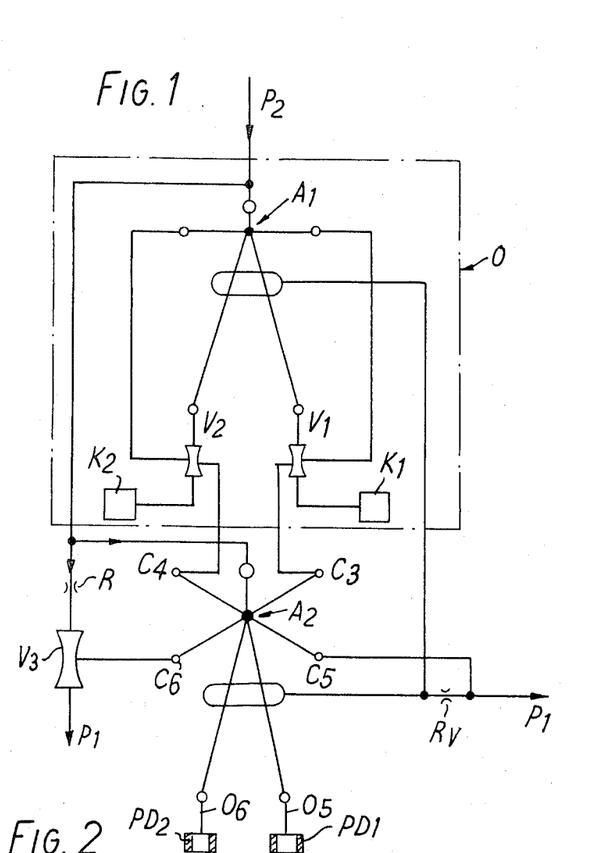
FIG. 1 is a diagram of a fluidic circuit employed to produce, from two pressures $P_2$ and $P_1$ supplied, at each of two outlets $O_5$ and $O_6$ of a symmetrical fluidic switching device, a pulse-width modulated pressure waveform whose duty ratio is substantially proportional to the ratio of the higher supply pressure $P_2$ to the lower supply pressure $P_1$.

Referring now first to FIG. 1, the illustrated apparatus, which serves to produce a pulse-width modulated pressure waveform with outputs $O_6$ and $O_5$ whose duty ratio is proportional to the ratio of a pressure $P_2$ to a second pressure $P_1$ of a compressible fluid substantially corresponds to that described in the U.S. Pat. No. 3,722,521 with reference to FIG. 6 thereof, but its arrangement and operation may be briefly described as follows:

It comprises an oscillator circuit O employing a proportional fluidic amplifier $A_1$, whose power jet is fed from the pressure $P_2$, which is the higher of the two above-mentioned pressures $P_2$ and $P_1$, and which is vented to the lower pressure $P_1$. Each of the two output branches of the amplifier $A_1$ is arranged to lead, via Venturi tubes $V_1$ and $V_2$ respectively, to fluid capacitors in the form of reservoirs $K_1$ and $K_2$ respectively. The control jets of the amplifier are respectively connected to the tappings of the Venturi tubes $V_1$ and $V_2$. This oscillator O will produce a symmetrical sawtooth waveform, which is fed from further tappings of the Venturi tubes $V_1$ and $V_2$, to one control jet $C_3$ and $C_4$ respectively of two pairs $C_3$, $C_6$, and $C_4$, $C_5$ of control jets of a dual-control proportional jet amplifier $A_2$, in which again the power jet is fed from the above-mentioned higher pressure $P_2$ while the vent of this amplifier $A_2$ and its control jet $C_5$ which faces the control jet $C_4$ connected to the tapping of the Venturi tube $V_2$ of the oscillator $A_1$, are connected to the lower pressure $P_1$. The remaining control jet $C_6$, namely that opposing pressure tapped from the Venturi tube $V_1$ of oscillator amplifier $A_1$, is connected to a tapping of a further Venturi tube $V_3$, which latter is fed, via a range-setting restrictor R, from the above-mentioned higher pressure $P_2$ and exhausts to the lower pressure $P_1$ although if desired it may be arranged to exhaust to a third pressure still lower than $P_1$. A further restrictor $R_V$ is interposed for matching purposes between the interconnected vents of the two amplifiers and the said connection to pressure $P_1$. It can be shown that the pressure at the tapping of the Venturi tube $V_3$, i.e., the pressure which is applied to the control jet $C_6$ which opposes the pressure applied to the control jet $C_3$ and derived from the tapping of the Venturi tube $V_1$ of the oscillator O will, so long as the pressure ratio $P_2/P_1$ exceeds a critical value, at which choking begins to occur in throat of the Venturi tube, be proportional to the pressure ratio $P_2/P_1$, so that its substitution for the pressure $P_1$ in one of the deflector jets of the dual-control amplifier $A_2$ will be equivalent to the vertical displacement of the reference level determining, by its intersection with the sawtooth waveform, the switch-over points of the power jet of the amplifier $A_2$ between its outputs $O_5$ and $O_6$ and will thereby vary the duty ratio of the pressure waveform at output $O_5$, which will increase or decrease in proportion with the pressure ratio $P_1/P_2$ while the duty ratio of the waveform in the other output $O_6$ will vary in the opposite direction since, as is a characteristic feature of the amplifier switch, the duty ratios of the pressure pulses in the two outputs $O_5$ and $O_6$ must complement each other to unity.

Figure 2:
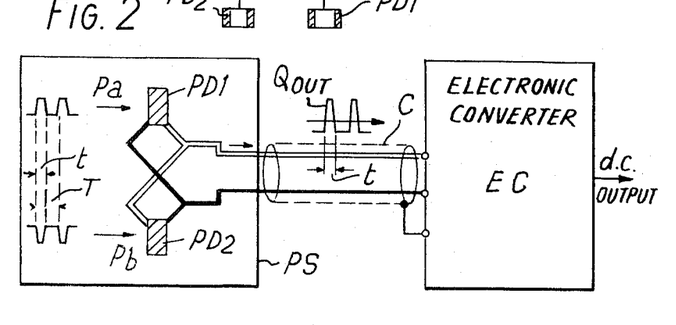
FIG. 2 is a block diagram illustrating the broad principle employed in the electrical evaluation system according to the invention.

In the illustrated embodiment, in which evaluation of the output waveform is arranged to be effected electronically, the pressure in each of the output branches $O_5$ and $O_6$ of the dual-control amplifier $A_2$ is applied to a piezoelectric transducer element $PD_1$ and $PD_2$ respectively, whose electrical connections are shown in FIG. 2.

Referring now to FIG. 2, two piezoelectric sensor elements $PD_1$ and $PD_2$, which form part of the fluidic unit PS, are respectively subject to the pressure waveform PA of the output pressure in output $O_5$ and to the pressure waveform PB appearing at the pressure output $O_6$ of FIG. 1, and it will be seen that the pulse width $t$, that is to say the length of time whose ratio to the full period T of a cycle constitutes the duty ratio which is arranged to vary in proportion to the ratio of the two input pressures $P_1/P_2$, is determined by a first change-over point at which the pressure PA begins to rise from its minimum value and the pressure PB begins to drop from its maximum value, and by the next change-over point, which defines the termination of the pulse, and at which the pressure PA begins to drop from its maximum and the pressure PB begins to rise from its minimum.

Upon the application of these pressure waveforms the piezoelectric transducers $PD_1$ and $PD_2$ produce electrical charge-output waveforms which, if the transducers operate without distortion within the range employed, can be considered to be also represented by the illustrated waveforms PA and PB respectively, while any distortion of the transducer function will increase or decrease from the momentary charge output as a function of the pressure applied at the moment in question. Apart from this, each of the transducer outputs will as is known in the case of piezoelectric transducers, be subject to voltage drift which tends to balance each transducer output about a neutral level which depends on the duty ratio of the waveform in such manner that at a given duty ratio the areas covered by the waveform at the two sides of the neutral level are equal.

As shown in FIG. 2, in order to apply the outputs of the two sensors $PD_1$ and $PD_2$ to an electronic converter unit EC which is intended to produce a DC output proportional to the duty ratio of the input pressure PA or PB, that is to say in the given example to the pressure ratio $P_1/P_2$, the two transducers are connected in parallel, but with their polarities reversed, to the two conductors of a cable C, which thus transmit the sum of the charge outputs of the two transducers with the sign of the charge output of one of these reversed in relation to the sign of the charge output of the other transducer. The charge output transmitted to the converter EC is thus represented by the waveform $Q_{out}$, which, apart from voltage-drift features of the individual outputs, which in any case will be neutralised by the reverse addition, has at the beginning of the pulse or duty period $t$ a negative value corresponding to the positive maximum of the output waveform of transducer $PD_2$ which, due to the manner of cross-connections as shown, is applied with a negative sign, and terminates at a positive level which corresponds to the upper peak of the amplitude of the output waveform of transducer $PD_1$, since at the moment in question the output of the transducer $PD_2$ is still at zero level. The relevant waveforms are shown more clearly in FIG. 3, in which the asymmetric shape of the rise and fall waveforms has been so chosen as to show clearly the way in which such asymmetry is neutralised by the utilisation of the halfway level for the evaluation of the combined output $Q_{out}$.

Figure 3:
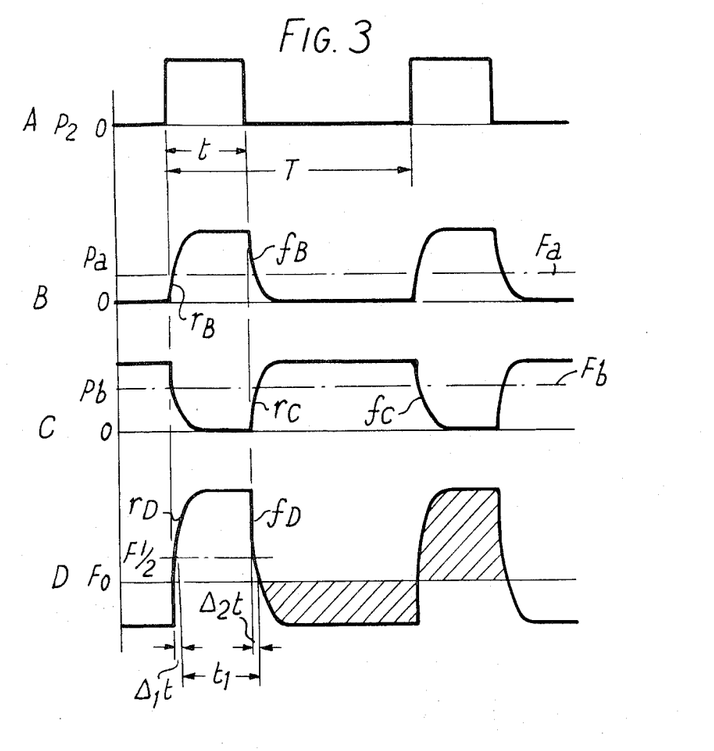
FIG. 3 shows, compared with an ideal square waveform, the individual waveforms obtained, for a given duty ratio, at the outputs of the two transducers respectively influenced by the pressure outputs at the two outlets of the fluidic device, and the combined waveform obtained by the inverse addition of the electrical values of the two transducer-output waveforms.

Referring now to FIG. 3, waveform A is an ideal pulse-width modulated square waveform; the ratio $t/T$ of the width $t$ of each pulse to the total pulse-cycle period $T$ constitutes the duty ratio of the waveform and is assumed, in the example, to be substantially proportional to the ratio $P_1/P_2$ of the pressures $P_2$ and $P_1$ applied to the fluidics unit PS shown in more detail in FIG. 1, waveforms B and C represent respectively the pressure outputs PA and PB after their conversion into electric-charge outputs by the transducers $PD_1$ and $PD_2$ respectively. At the beginning of operation, both output waveforms have a zero bottom level, while the chain-dotted line Fa and Fb respectively indicates the mean-level voltage which will establish itself in each case as a result of voltage drift.

The waveform shown at D similarly indicates the composite output waveform $Q_{out}$ which results from the reverse addition of the respective algebraic values of the two pulse waveforms B and C, Fo being the neutral level which will eventually establish itself in such manner that the areas shown hatched and located respectively above and below the said level are equal to each other within each cycle period $T$. Since it can be assumed that, owing to the symmetrical construction of the fluidic amplifier A2 in FIG. 1, and to the identical construction of the transducers $PD_1$ and $PD_2$, the shape and scale of the rising edges $r_C$ of the waveform C are identical with those of the rising edges $r_B$ of the waveform B and similarly the shape and scale of the falling edges $f_C$ in waveform C are identical with those of the falling edges $f_B$ of the waveform B, it will be readily understood that since the waveform D representing $Q_{out}$ is obtained by the reverse addition of the values of waveform C to the values of waveform B, the shape and scale of the falling edge $f_D$ of the waveform $Q_{out}$ is identical with the shape and scale of the rising edge $r_D$ of the same waveform, except that the gradients of the two said edges are mutually reversed. The chain-dotted line marked F½ indicates halfway level between the upper and lower amplitude peaks of the waveform $Q_{out}$, and according to the present invention, the duty ratio is determined by referring to the intersections of the charge waveform $Q_{out}$ with this halfway level.

Looking at this level F½, it will be readily appreciated that the point of intersection of the falling edge $f_D$ is delayed relative to the corresponding switch-over point determined by the end of the pulse period $t$ in waveform A which constitutes the starting point of the edge $f_D$ by a time $\Delta 2t$ which, owing to the above-explained identity of shape and scale of the rising and falling edges $r_D$ and $f_D$ is equal to the amount of $\Delta 1t$ by which the intersection of the rising front $r_D$ with the halfway level F½ is delayed relative to the beginning of the pulse period $t$, that is to say relative to the point at which the rising edge $r_D$ commences from the bottom level of the pulse waveform $Q_{out}$. The time $t_1$ between the respective points of intersection of the halfway level F½ with the rising and falling front edges $r_D$ and $f_D$ is therefore equal to the pulse period $t$ between the respective starting points of the rising and falling edges $r_D$ and $f_D$.

Figure 4:
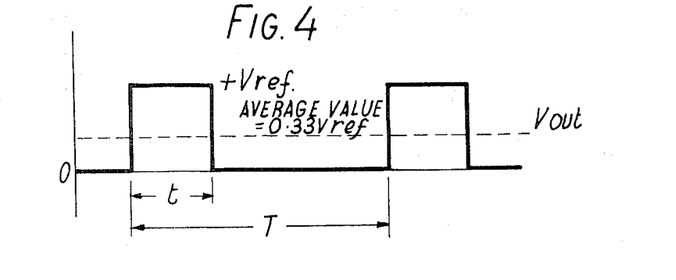
FIG. 4 shows a demodulator waveform.

In order to utilise this feature for obtaining a voltage output which is proportional to the duty ratio of the pressure pulses which represents, in the chosen example, the pressure ratio $P_1/P_2$, the electronic converter EC employs an amplifier, preferably a charge amplifier, which may consist essentially of high-input impedance amplifier with overall negative feedback applied by means of a capacitor, and which will produce an output voltage proportional to the charge supplied in the output waveform $Q_{out}$. This use of a charge amplifier has the advantage that the high input capacitance of this amplifier will minimise the effect of the shunt capacitance of the cable C and of leakage due to shunt conductance in the cable. The converter EC further includes arrangements for obtaining from the output of this charge amplifier a rectangular waveform similar to the waveform shown at A and having the appropriate duty ratio, means for keeping the amplitude of this waveform at a constant value $V_{ref}$, and an integrating arrangement producing a D-C output proportional to the average voltage of this waveform measured from the lower peak level of its amplitude and integrated over a full cycle period $F$. This D-C output thus supplies a voltage which is related by the duty ratio $t/T$ to the total amplitude of the waveform; this total amplitude thus serves as a reference voltage. This is illustrated for the example of the duty ratio 0.33 in FIG. 4 in which the line $V_{out}$ indicates the output voltage of the averaging amplifier as 0.33 of the reference voltage $V_{ref}$ in accordance with the assumed duty ratio of 0.33.

Figure 5:
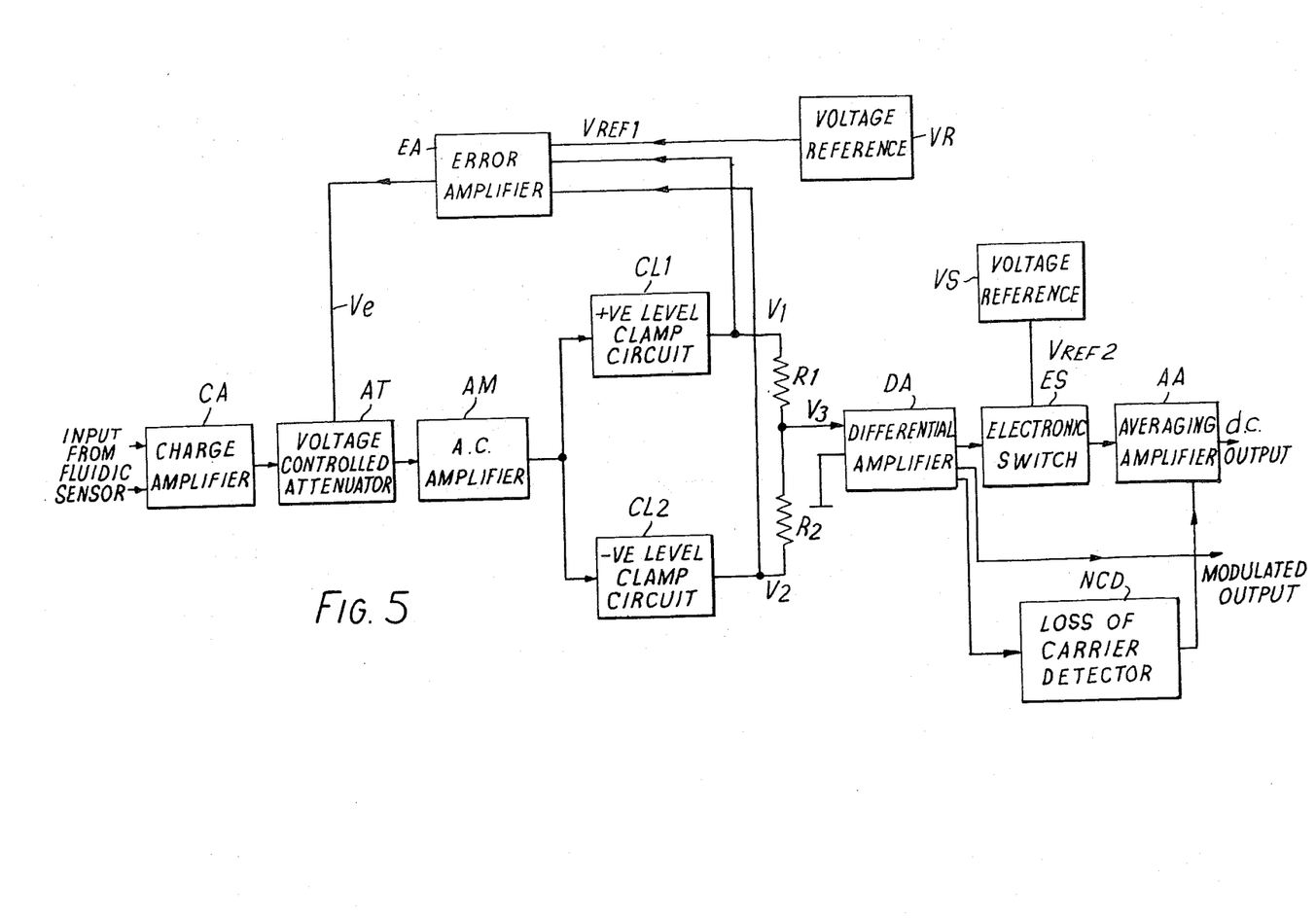
FIG. 5 is a block diagram of one form of electronic converter suitable for the system of FIG. 2.

A block diagram of one form of the electronic converter EC is shown in FIG. 5. The charge amplifier is shown at CA; its output is further amplified by an alternating-current amplifier AM, with the interposition of an attenuator AT between the charge amplifier CA and the alternating-current amplifier AM, to produce a high-level A-C output voltage. A balanced type of input circuit is used in order to achieve a high rate of rejection of common-mode interference. The attenuator AT is utilised to achieve an automatic gain-control function in order to keep the peak-to-peak output voltage of the A-C amplifier AM approximately constant, and may incorporate a field-effect transistor, which has the property that its resistance is dependent upon the level of bias voltage applied to its gate electrode, so that the degree of signal attenuation is a function of this bias voltage, which is applied to it in a way which will be described further below.

The alternating-current voltage output of the amplifier AM is applied in parallel to two clamp circuits $CL_1$ and $CL_2$, which are rectifier-type circuits and produce respectively alternating voltages $V_1$ and $V_2$ which both have the same amplitude $V_{pp}$, and both of which are replicas in shape of the output voltage Vac of the A-C amplifier AM, but which differ in that the negative peaks of the one and the positive peaks of the other are clamped to zero. The voltages $V_1$ and $V_2$ are respectively applied to the two ends of a centre-tapped load circuit including two resistors $R_1$ and $R_2$ of equal values so that, since furthermore $V_1 - V_2$ is equal to the peak-to-peak value $V_{pp}$ of the output voltage $V_{ac}$ of the amplifier AM, the voltage $V_3$ appearing at the centre tapping is equal to $V_2 + \frac{1}{2}V_{pp}$. It is thus a voltage which has the same waveform as the output-voltage waveform $V_{ac}$ of the amplifier AM, and its D-C level is such that the zero voltage line passes through the halfway level of amplitudes.

An error amplifier EA is employed to produce the bias voltage applied to the attenuator AT in order to maintain the peak-to-peak voltage $V_{pp}$ of the output voltage $V_{ac}$ of the A-C amplifier AM approximately constant. This error amplifier is a differential amplifier to which output voltages $V_1$ and $V_2$ of the two clamp circuits $CL_1$ and $CL_2$ as well as a reference voltage $V_{REF1}$ from a reference voltage source VR are applied. The differential amplifier EA compares a signal proportional to $V_1 - V_2$ with the reference level of voltage $V_{REF1}$ to produce an amplified error signal $V_e$ which it applies to the attenuator AT with such a polarity that when $V_{pp}$ exceeds a predetermined level, the application of the error-signal voltage $V_e$ to the attenuator AT increases attenuation and vice versa.

Figure 6:
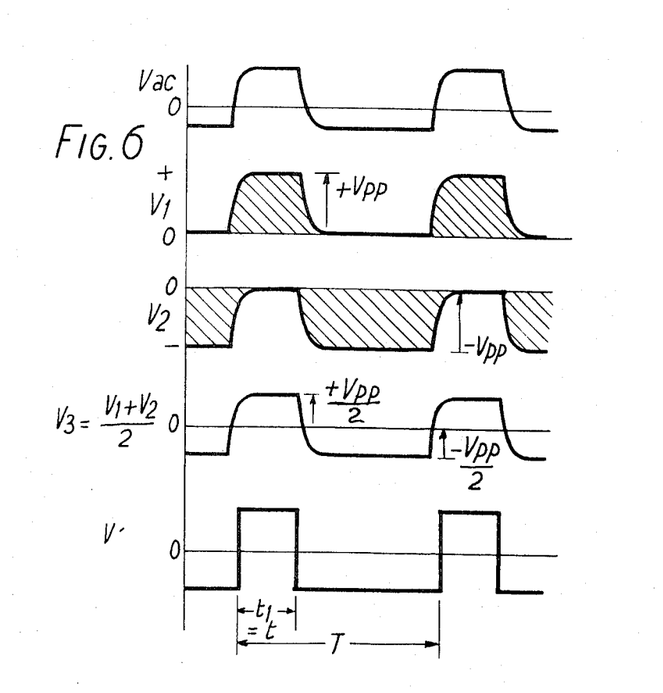
FIG. 6 shows signal-processor waveforms obtained by this converter.

FIG. 6 shows a number of waveforms which illustrate the effects discussed with reference to FIG. 5. Waveform A is the output waveform $V_{ac}$ of the A-C amplifier AM and is area-balanced about a zero voltage-level line. Waveforms B and C respectively represent the output voltages $V_1$ and $V_2$ of the two clamp circuits $CL_1$ and $CL_2$, the waveform B representing the voltage $V_1$ being clamped to the lower peak level and the other clamp-circuit output voltage $V_2$ being clamped to the upper peak level of an otherwise identical waveform. Waveform D represents the voltage $V_3$ at the output of the centre-tapped load circuit. Like the two input voltages of the clamp circuit, it is identical otherwise to the waveform A which represents the voltage waveform $V_{ac}$ at the output of the amplifier AM, but is clamped to a D-C level halfway between the upper and lower peak levels of its amplitude. This output waveform $V_3$ is now utilised to produce a rectangular waveform whose duty ratio $t/T$ is equal to the duty ratio determined by the points of intersection of the voltage $V_3$ with the zero D-C level to which the waveform has been clamped. For this purpose the voltage $V_3$ is applied, as shown in FIG. 5 to a direct-coupled high-gain differential amplifier DA which compares the voltage $V_3$ with the D-C zero level and amplifies the difference voltage. Since, due to the high gain of the amplifier, DA, a very samll excursion of the input voltage from the zero level causes the amplifier output to reach the negative or positive saturation level, according to the direction of the voltage excursion, the output of this amplifier will be the rectangular waveform shown at E in FIG. 6.

Figure 7:
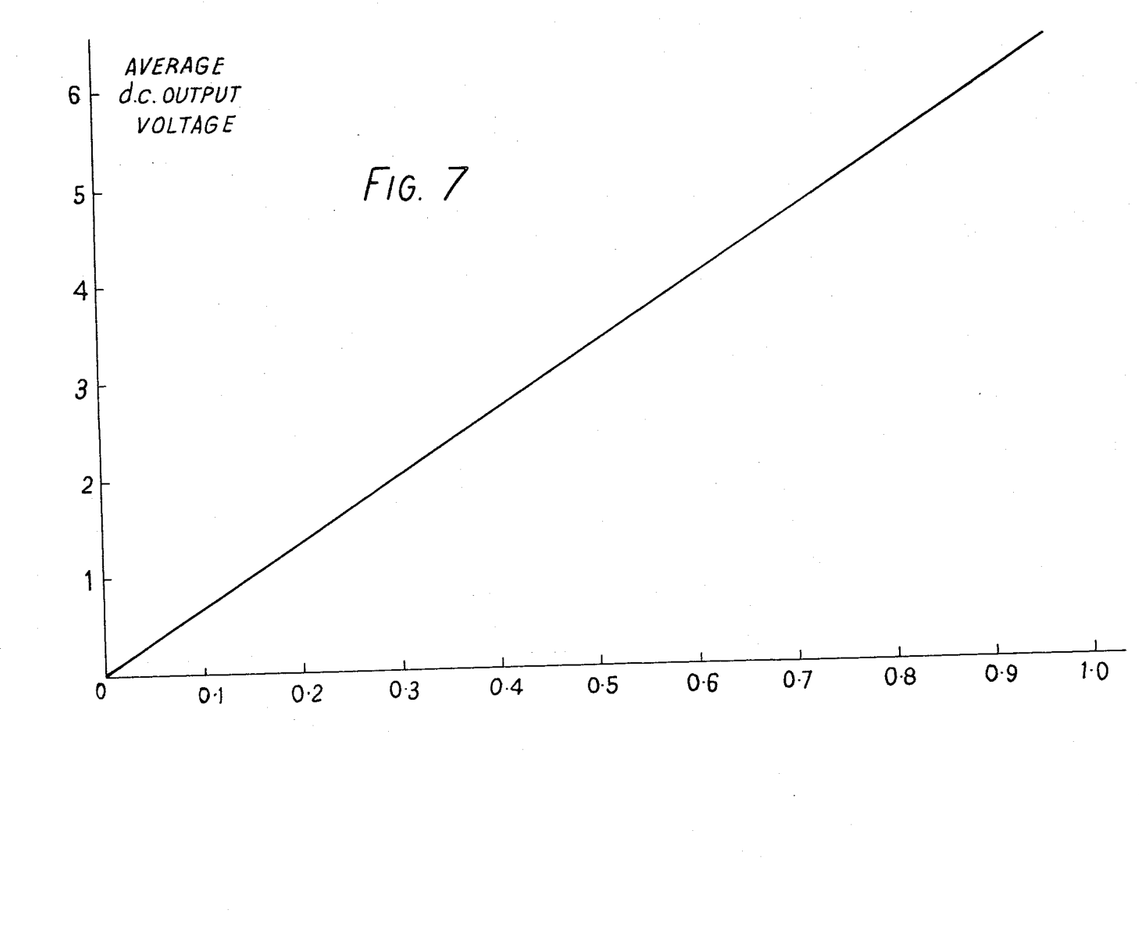
FIG. 7 shows the characteristic of the average D-C output voltage plotted against the duty ratio of the demodulator.
Figure 8:
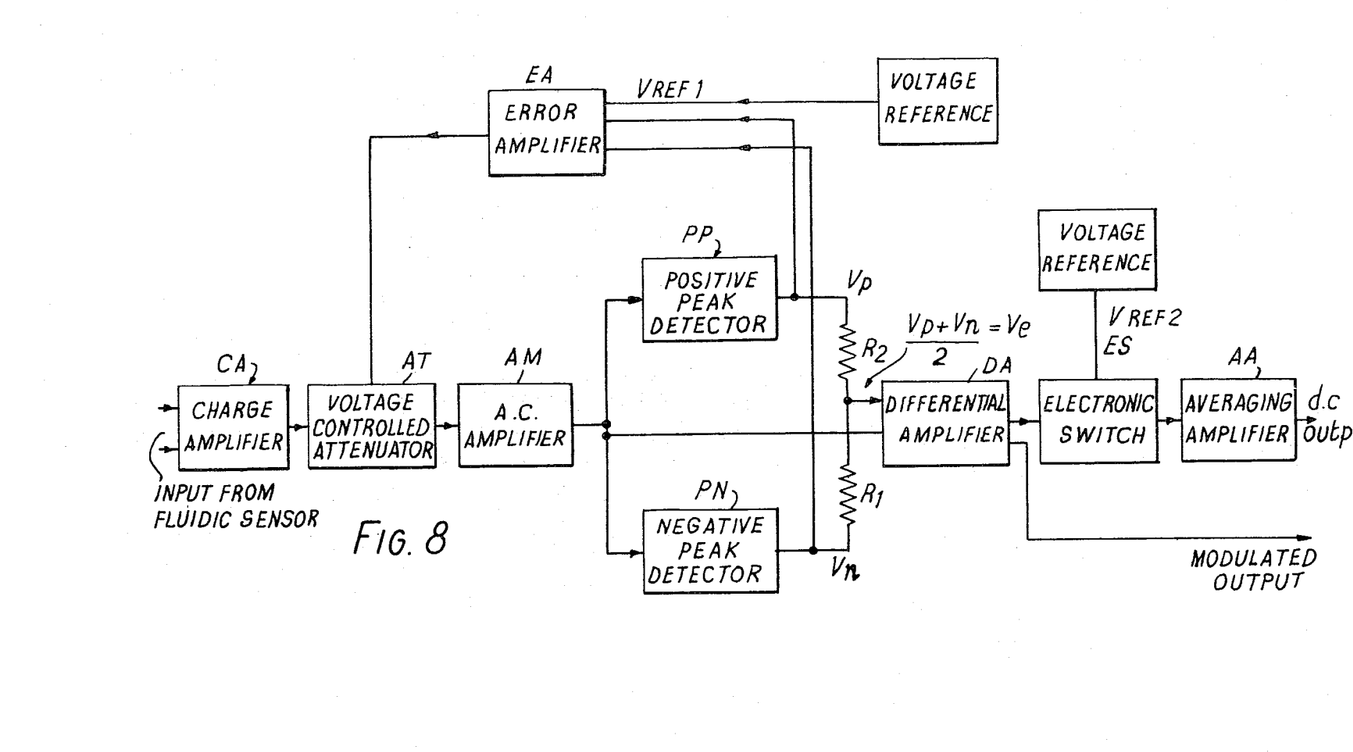
FIG. 8 is a block diagram of an alternative form of electronic converter.
Figure 9:
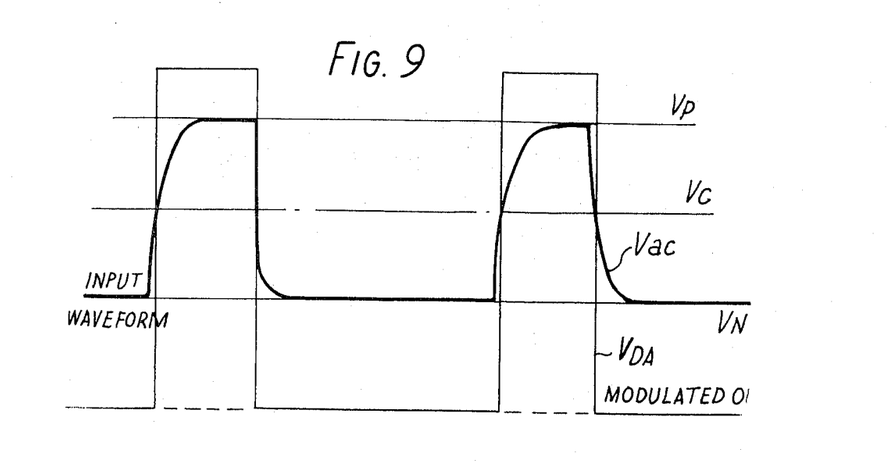
FIG. 9 is a waveform diagram illustrating the sampling method employed in the converter shown in FIG. 8.

Referring now once more to FIG. 5, this output voltage of amplifier DA is applied to a demodulation circuit consisting of an electronic switch ES, which is followed by an averaging amplifier AA. Applied to the electronic switch is a reference voltage $V_{REF2}$ from a voltage reference source $V_s$; the electronic switch supplies pulses of this reference voltage to the averaging amplifier AA in accordance with the sign of the voltage of the differential amplifier output $V_{out}$ so that electronic switch supplies to the averaging amplifier unidirectional pulses of constant voltage equal to $V_{REF2}$ and of a pulse width equal to that of the differential-amplifier output shown in waveform E of FIG. 6. The result is that the smooth output voltage of the averaging amplifier AA is proportional to the time average of the voltage value of this constant-amplitude waveform and therefore proportional to the duty ratio $t/T$ of the waveform shown at E in FIG. 6 and thus of the waveforms produced by the transducers $PD_1$ and $PD_2$ and shown at B and C in FIG. 2. This linear relation is illustrated in FIG. 7, which shows an example in which the average open-circuit D-C output voltage reaches 5.0 volt at a duty ratio of 0.75. It will be readily appreciated that the circuit described with reference to FIG. 5 may be modified in various details without exceeding the scope of the invention. Thus FIG. 8 illustrates a modified form of the circuit which uses alternative means for processing the output signal $V_{ac}$ of the A-C amplifier AM in order to sample it at the halfway level between the upper and lower peaks of the amplitude. In this modified circuit the clamp amplifiers $CL_1$ and $CL_2$ which in the embodiment of FIG. 5 produce the voltages applied to the centre-tapped load system $R_1$, $R_2$ have been replaced by a positive-peak detector PP and a negative-peak detector PN respectively, which produce, as shown in FIG. 9, direct voltages $V_p$ and $V_n$ respectively equal to the upper and lower amplitude peaks of the output voltage $V_{ac}$ of the AC amplifier AM. The output voltage $V_c$ of the center tapped load circuit $R_1$, $R_2$ is therefore equal to the mean of the respective upper and lower peak voltages $V_p$ and $V_n$. This voltage $V_c$ is applied to the differential amplifier DA in place of the combined voltage output of the clamp $CL_1$ and $CL_2$ circuits of FIG. 5 while the output waveform $V_{ac}$ of the A-C amplifier AM is applied to the other input of the differential amplifier DA. The differential amplifier DA therefore produces a rectangular waveform which changes its sign when the momentary value of the output waveform $V_{ac}$ of the A-C amplifier AM passes through the mean of the upper and lower peaks of the voltage waveform $V_{ac}$ or, in other words, through the halfway level of the waveform $V_{ac}$. As above explained, this ensures that the duty ratio of the output waveform $V_{DA}$ of the differential amplifier DA is equal to the duty ratio of the waveform at the input to the electronic converter EC.

It will be noted that, although in the case of FIG. 8 the voltages $V_p$ and $V_n$ applied from the input of the load network $R_1$, $R_2$ to the error amplifier EA are different from the voltages $V_1$ and $V_2$ thus applied in the case of FIG. 5, the difference between these voltages, is nevertheless in both cases of the same value $V_{pp}$ representing the difference between the positive and negative amplitude peaks of the output waveform $V_{ac}$ of the A-C amplifier AM.

It should also be mentioned that, while we have described the arrangements for clamping a waveform that is non-symmetric in relation to a line parallel to the time axis, to a D-C voltage level halfway between the upper and lower peak values of the waveform amplitude, as applied to apparatus for determining the duty ratio of certain waveforms, at least part of the apparatus is capable of more general application and the invention should therefore not be considered to be limited to this particular application.

According to another modification, the apparatus may be equipped with a safety device which can produce a signal when no A-C input is received by the charge amplifier. The production of such a signal is desirable because in view of the automatic gain control applied to the attenuator AT, the absence of such input might lead to the production of a spurious duty-ratio indication as a result of external influences. Such a safety device may, comprise a loss-of-carrier detector NCD (FIG. 5) to which the output waveform at the centre tapping of the load network $R_1$, $R_2$ is applied via the differential amplifier DA, and which responds to the absence of a suitable amount of a frequency within a limited range of the carrier frequency $1/T$ to produce a signal which may, as shown, be applied to the averaging amplifier AA to move its output value to a region distinct from that region in which the output is normally expected.

It may be mentioned that the individual transmission, through a common cable, and addition with the signs of one reversed, of the electrical outputs respectively corresponding to the pressures at the two outlets of the fluidic device also tends to reduce the effects of mechanical vibrations because the resulting signals produced by the two transducers oppose each other.

What we claim is:

1. Apparatus for evaluating width-modulated pulse waveforms, more particularly fluidic pulse waveforms, which are obtained at the two outlets of a substantially symmetrically constructed two-way switching device, which comprises means arranged to form, as a composite waveform, the algebraic sum of the outputs respectively obtained at the two outlets of the said switching device with the sign of one of these outputs reversed, and means operative to determine the pulse width-to-cycle ratio, hereinafter called the duty ratio, of the said composite waveform at a level halfway between the minimum and maximum levels thereof.

2. Apparatus as claimed in claim 1, for evaluating a pulse-width-modulated fluidic pressure waveform, wherein such pulse-width-modulated fluidic-pressure waveform is, for the purpose of its evaluation, converted into an electrical waveform.

3. Apparatus as claimed in claim 1 for evaluating a pulse-width-modulated fluidic pressure waveform, wherein means are provided which convert the pressure at each of the two outlets of the said switching device individually into an electrical waveform, and means which algebraically add, with reversed sign, the electrical waveform obtained by conversion of the pressure waveform at one of the outlets to the electrical waveform obtained by conversion of the pressure waveform at the other outlet.

4. Apparatus as claimed in claim 2, wherein the electrical waveform representing said algebraic sum is applied in parallel to two clamp circuits each arranged to produce a replica of the waveform clamped respectively to the upper and to the lower peak level of the waveform amplitude, and wherein the two outputs of these clamp circuits are applied to a load circuit so centre-tapped as to produce a replica of the waveform which is so clamped in its D-C level that its voltage passes through zero halfway between the upper and lower peaks of the amplitude of the waveform, the output from said centre tapping and a zero voltage-level reference being applied to a final evaluator circuit responsive to the times and directions of the zero passages of the waveform obtained at said centre tapping.

5. Apparatus as claimed in claim 2, wherein the electrical waveform representing said algebraic sum is applied in parallel to two peak-voltage detectors arranged to produce output voltages respectively corresponding to the upper and to the lower peak level of the said waveform, these output voltages being respectively applied to the two ends of a centre-tapped load circuit to produce at the centre tapping a reference voltage-level, this reference voltage-level and the said waveform being applied to a final evaluator circuit responsive to the times and directions of the passages of the voltage of said waveform through said reference voltage-level.

6. An electrical circuit for evaluating the duty ratio of a pulse-width modulated periodic electrical waveform, wherein the waveform is applied in parallel to two clamp circuits each arranged to produce a replica of the waveform clamped respectively to the upper and to the lower peak level of the waveform amplitude, and wherein the two outputs of these clamp circuits are applied to a load circuit so centre-tapped as to produce a further replica of the waveform which is so clamped in its D-C level that its voltage passes through zero halfway between the upper and lower peaks of the amplitude of the waveform, the output from said centre tapping and a zero-voltage level reference being applied to a final evaluator circuit responsive to the times and directions of the zero passages of the waveform obtained at said centre tapping.

7. An electrical circuit as claimed in claim 6, wherein said final evaluator comprises a high-gain differential amplifier arranged to produce an amplifier output which changes abruptly from saturation voltage in one direction to saturation voltage in the opposite direction at each zero passage of said further replica of the waveform.

8. An electrical circuit as claimed in claim 7, wherein the output of said high-gain differential amplifier is applied to an electronic switch connected to a constant voltage supply to produce a rectangular waveform changing, between zero voltage and the constant voltage of said supply, at each crossing of the reference-voltage level by the said further replica waveform, this rectangular waveform being applied to an averaging amplifier.

9. An electrical circuit for evaluating the duty ratio of a pulse-width modulted periodic electrical waveform, wherein the said waveform is applied in parallel to two peak-voltage detectors arranged to produce output voltages respectively corresponding to the upper and to the lower peak level of the said waveform, these output voltages being respectively applied to the two ends of a centre-tapped load circuit to produce at the centre tapping a reference voltage-level, this reference voltage level and the said waveform being applied to a final evaluator circuit responsive to the times and directions of the passages of the said voltage of said waveform through said reference voltage-level.

10. An electrical circuit as claimed in claim 9, wherein said final evaluator circuit comprises a high-gain differential amplifier for comparison of said reference - voltage level with the momentary voltage of the said waveform, so that the sign of the output of the differential amplifier changes each time the momentary voltage of the said waveform crosses a voltage-level halfway between the upper and lower voltage peaks of the said waveform.

11. An electrical circuit as claimed in claim 10, wherein the output of said high-gain differential amplifier is applied to an electronic switch connected to a constant-voltage supply to produce a rectangular waveform changing, between zero voltage and the constant voltage of said supply, at each crossing of the said waveform with said reference level, this rectangular waveform being applied to an averaging amplifier.

* * * * *